US009112852B2

(12) United States Patent
Zhu et al.

(10) Patent No.: US 9,112,852 B2
(45) Date of Patent: Aug. 18, 2015

(54) METHOD AND APPARATUS FOR MANAGING IDENTITY FOR MOBILE TERMINAL

(71) Applicant: TENCENT TECHNOLOGY (SHENZHEN) COMPANY LIMITED, Shenzhen (CN)

(72) Inventors: Tao Zhu, Shenzhen (CN); Jungui Chen, Shenzhen (CN); Feng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 89 days.

(21) Appl. No.: 13/951,628

(22) Filed: Jul. 26, 2013

(65) Prior Publication Data
US 2013/0318591 A1 Nov. 28, 2013

Related U.S. Application Data

(63) Continuation of application No. PCT/CN2012/070228, filed on Jan. 11, 2012.

(30) Foreign Application Priority Data

Jan. 27, 2011 (CN) .......................... 2011 1 0032478

(51) Int. Cl.
*G06F 21/41* (2013.01)
*H04L 29/06* (2006.01)
(Continued)

(52) U.S. Cl.
CPC ............ *H04L 63/0815* (2013.01); *G06F 21/31* (2013.01); *G06F 21/41* (2013.01); *H04L 9/321* (2013.01); *G06F 2221/2115* (2013.01)

(58) Field of Classification Search
CPC ........................... H04L 63/0815; G06F 21/41
USPC .......................................................... 726/8
See application file for complete search history.

(56) References Cited

U.S. PATENT DOCUMENTS 7,174,383 B1    2/2007   Biswas et al.
2002/0188736 A1* 12/2002 Jarvensivu ..................... 709/229
(Continued)

FOREIGN PATENT DOCUMENTS

CN    101207485 A    6/2008
CN    101441734 A    5/2009
(Continued)

OTHER PUBLICATIONS

International Search Report for International Patent Application No. PCT/CN2012/070228, dated Apr. 19, 2012, and English translation thereof.

(Continued)

*Primary Examiner* — Lisa Lewis
*Assistant Examiner* — Zhimei Zhu
(74) *Attorney, Agent, or Firm* — Harness, Dickey & Pierce, P.L.C.

(57) ABSTRACT

A method and apparatus for managing an identity for a mobile. The method comprises identifying an application sending an identity verification request when receiving the identity verification request from one of multiple applications, sending a request message obtained according to the identity verification request to an identity verification server; and notifying all applications in a related application list comprising the identified application of an identity verification result obtained according to a returned message, when receiving the returned message from the identity verification server. Centralized management is performed for user identity information and user identity verification, development and maintenance cost is reduced, security of the user account is increased, and operations of the user are facilitated.

17 Claims, 2 Drawing Sheets

Figure 1:
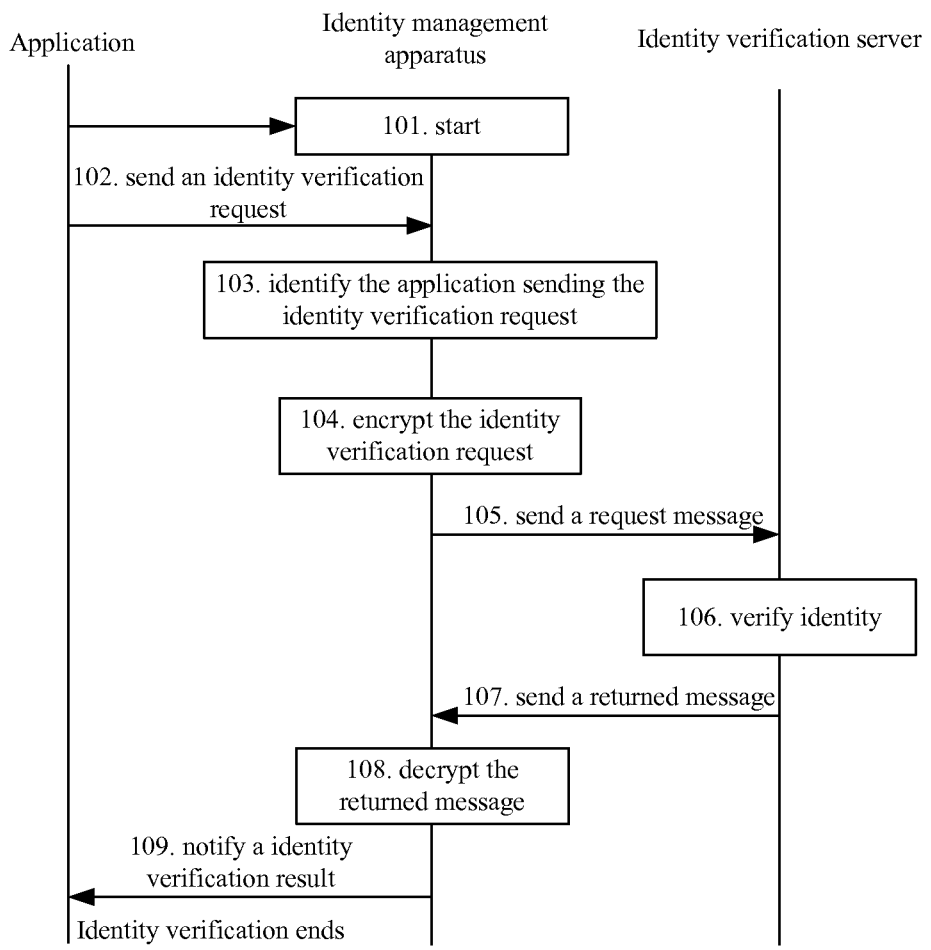

(51) Int. Cl.
*H04L 9/32* (2006.01)
*G06F 21/31* (2013.01)

(56) References Cited

U.S. PATENT DOCUMENTS

| | | | |
|---|---|---|---|
| 2003/0010776 A1 | 1/2003 | Kang et al. | |
| 2004/0225878 A1* | 11/2004 | Costa-Requena et al. | 713/150 |
| 2005/0079866 A1* | 4/2005 | Chen et al. | 455/435.1 |
| 2006/0129935 A1* | 6/2006 | Deinlein et al. | 715/733 |
| 2007/0033392 A1* | 2/2007 | Ganesan et al. | 713/155 |
| 2008/0046983 A1 | 2/2008 | Lester et al. | |
| 2009/0094372 A1* | 4/2009 | Nyang et al. | 709/229 |
| 2009/0172784 A1* | 7/2009 | Park et al. | 726/4 |
| 2009/0300733 A1* | 12/2009 | Inomata et al. | 726/5 |
| 2010/0041382 A1* | 2/2010 | Van Os et al. | 455/418 |
| 2010/0299359 A1* | 11/2010 | Peng et al. | 707/769 |
| 2011/0061098 A1* | 3/2011 | Konya et al. | 726/8 |
| 2011/0093941 A1* | 4/2011 | Liu et al. | 726/7 |
| 2011/0202989 A1* | 8/2011 | Otranen et al. | 726/8 |
| 2012/0005738 A1* | 1/2012 | Manini et al. | 726/7 |
| 2012/0023556 A1* | 1/2012 | Schultz et al. | 726/4 |
| 2012/0078756 A1* | 3/2012 | Tsugihashi et al. | 705/27.1 |
| 2012/0190386 A1* | 7/2012 | Anderson | 455/456.3 |

FOREIGN PATENT DOCUMENTS

| | | |
|---|---|---|
| CN | 101453328 A | 6/2009 |
| KR | 2003-0050177 A | 6/2003 |
| KR | 2008-0073620 A | 8/2008 |
| WO | 2007/060034 A1 | 5/2007 |

OTHER PUBLICATIONS

Chinese Office Action for Application No. 2011100324789 dated Apr. 28, 2015, and its concise explanation of relevance in English thereof.

* cited by examiner

METHOD AND APPARATUS FOR MANAGING IDENTITY FOR MOBILE TERMINAL

CROSS-REFERENCE TO RELATED APPLICATIONS

This application is a continuation of International Application No. PCT/CN2012/070228, filed on Jan. 11, 2012, which claims the benefit and priority of Chinese Patent Application No. 201110032478.9, filed on Jan. 27, 2011. The entire disclosures of each of the above applications are incorporated herein by reference.

FIELD

The present disclosure relates to mobile communication technologies and to a method and apparatus for managing an identity for a mobile terminal.

BACKGROUND

This section provides background information related to the present disclosure which is not necessarily prior art.

Along with the developments of mobile communication technologies and embedded technologies, functions of mobile terminals have become more and more powerful. By means of applications in the mobile terminals, users may browse news, receive and send emails, and chat with other network users, etc. Many applications, such as Instant Messenger (IM) software, online games, and email clients, etc., will not work normally unless identity verification on a server side is verified. Thus, in addition to main functional modules, the application needing identity verification also includes an identity management module which is configured to manage account information and interact with the server side for the identity verification, etc.

In the existing technologies, each of the applications needing identity verification includes a similar identity verification module. Thus, the similar software functions are developed repeatedly, and for the mobile terminal which has much less processing capability and storage capability when compared with a personal computer (PC), many processing capabilities and much more storage space are consumed. Furthermore, an internet corporation usually develops a series of applications for users, and the user may log in to the series of applications by using the same identity (e.g. the same account and the same password). In this case, the user prefers no more operations of identity verification when logging in to other related applications after the previous identity verification is performed at a time. For example, after logging in to a QQ space application by using a QQ account, the user wants to directly log in to a QQ microblog and a QQ mailbox by using the same QQ account without any other identity verifications. Unfortunately, in existing technical solutions, identity information is not shared among various different applications. Each of the applications require the user to perform the identity verification when opening, and thus the same identity is verified multiple times. Accordingly, the user cannot enjoy smooth experiences, and risk of user identity leakage is increased. Moreover, since the same identity information is used by several applications and centralized management cannot be performed, security risk is increased. In addition, if a specific operation (e.g., verification code inputting) needs to be supplemented to the identity verification operation of all applications, each of the applications needs to be configured respectively, which is extremely troublesome and laborious.

In summary, the existing identity management solutions have at least the following deficiencies: software functions are developed repeatedly, user identities are managed separately, the security risk is high and it is difficult to modify configurations.

SUMMARY

This section provides a general summary of the disclosure, and is not a comprehensive disclosure of its full scope or all of its features.

In view of the above, the embodiments of the present invention provide a method and apparatus for managing an identity for a mobile terminal, so as to implement centralized management for user identity information and user identity verification.

Technical solutions are implemented as follows.

A method for managing an identity for a mobile terminal comprises:

at a mobile terminal having one or more processors and one or more memories, identifying an application sending an identity verification request when receiving the identity verification request from one of multiple applications, sending a request message obtained according to the identity verification request to an identity verification server; and notifying all applications in a related application list comprising the identified application of an identity verification result obtained according to a returned message when receiving the returned message from the identity verification server.

An apparatus for managing an identity for a mobile terminal comprises:

one or more processors;

one or more memories storing modules executed by one or more processors comprising:

an identifying module, adapted to identifying an application sending an identity verification request when receiving the identity verification request from one of multiple applications;

a sending and receiving module, adapted to send a request message obtained according to the identity verification request to an identity verification server, and receive a returned message from the identity verification server; and a notifying module, adapted to notify all applications in a related application list comprising the identified application of an identity verification result obtained according to the returned message.

A machine-readable storage medium storing instructions to cause a mobile terminal to execute a method comprises:

identifying an application sending an identity verification request when receiving the identity verification request from one of multiple applications, sending a request message obtained according to the identity verification request to an identity verification server; and notifying all applications in a related application list comprising the identified application of an identity verification result obtained according to a returned message when receiving the returned message from the identity verification server.

It can be seen from the above solutions, various embodiments provide an identity management solution to implement centralized management for the identity information and the identity verification. In the solutions, the identity verification requests from multiple applications are received and sent to the identity verification servers corresponding to the applications, so that the repeated development of software functions is avoided, centralized management is performed for user information, the security risk is reduced, and it is convenient to upgrade the identity management solution. In addition, the related application list is established in the identity management solution provided by various embodiments, so that when the verification result of one application in the list is received, all the applications in the list are notified of the verification result. Therefore, the applications in the list may directly implement the traffic logic without requesting the identity verification, user's time is saved and the risk of identity leakage caused by repeated verification is reduced.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
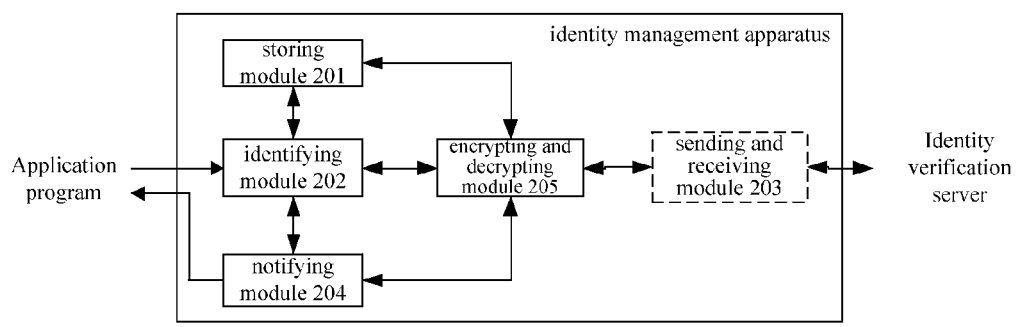

FIG. 1 is a flowchart illustrating identity verification for an application in a mobile terminal according to various embodiments; and FIG. 2 is a schematic diagram illustrating a structure of an apparatus for managing an identity for a mobile terminal according to various embodiments.

Corresponding reference numerals indicate corresponding parts throughout the several views of the drawings.

DETAILED DESCRIPTION

Example embodiments will now be described more fully with reference to the accompanying drawings.

The embodiments of the present invention provide a method and apparatus for managing an identity for a mobile terminal, so as to implement centralized identity information management and centralized identity verification for multiple applications in the mobile terminal.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the various embodiments in conjunction with the accompanying drawings in FIGS. 1-2. It should be understood that specific embodiments described herein are merely intended to explain the present disclosure, but not intended to limit the present disclosure. In accordance with the purposes of this disclosure, as embodied and broadly described herein, this disclosure, in one aspect, relates to method and apparatus for managing an identity for a mobile terminal.

Examples of mobile terminals that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to one skilled in the art.

In various embodiments, in order to provide an identity verification service for the multiple applications in the mobile terminal and avoid repeatedly verifying an identity which has been verified, when an identity verification request from one of multiple applications is received, an application sending the identity verification request is identified, a request message obtained according to the identity verification request is sent to an identity verification server, and when a returned message from the identity verification server is received, all applications in a related application list including the identified application is notified of an identity verification result obtained according to the returned message.

FIG. 1 is a flowchart illustrating identity verification for an application in a mobile terminal according to various embodiments. As shown in FIG. 1, the method includes the following steps.

At 101, in response to an initiating event of one of multiple applications, starts up an identity management apparatus.

When the identity management apparatus is started up, a storing module in the identity management apparatus is initialized. Data stored in the storing module include: user information, an application information list and more than one related application lists. The user information includes simple information related to a user (i.e. public information not related to user privacy) and identity information (i.e. binary information uniquely identifying a user identity), etc. The application information list includes identifier information of applications and a server address corresponding to each application, etc. Each related application list includes identifier information of multiple applications which are published by one corporation, and the multiple applications share one account to log in a server. The identity management apparatus may automatically add a set of applications to the related application list by identifying some fields in the identifier information of the applications. In addition, the application may add itself to more than one related application lists by registering a receiver used to receive information such as the identity verification result, so that when the identity management apparatus notifies another application requesting identity verification of the identity verification result, the application may also receive the identity verification result. The information is stored in the storing module by using a ciphertext mode. After the initialization is completed, the stored information is decrypted for being read, and is stored in an internal memory by using a hash list.

At 102, at least one of the multiple applications sends an identity verification request to the identity management apparatus.

Before sending the identity verification request, the application may read the user information in the hash list to select appropriate identity information (e.g., an account); or the application may write or modify the identity information directly, and the identity management apparatus need to store the written or modified identity information into the hash list and the storing module. Because multiple applications in the mobile terminal share the identity management apparatus, it is possible that several threads or applications access the data stored in the identity management apparatus and modify the data simultaneously, security of concurrent access needs to be guaranteed. In various embodiments, the hash list is guaranteed to be accessed in serial, which is implemented by different operation systems in different modes. For example, under operation system of Android, a hash structure of ConcurrentHashMap type is implemented, and, under operation of Windows Mobile, an object, e.g., a critical region is used to guarantee serial access to codes of the hash list.

At 103, when receiving the identity verification request, the identity management apparatus identifies the application sending the identity verification request.

For the purpose of sending the identity verification request and notifying of an identity verification result later, the identity management apparatus utilizes the identifier information of the application extracted from the identity verification request, searches the application information list for information related to the application, e.g., an address of an identity verification sever corresponding to the application and a related application list including the application. If the identifier information of the application is not included in the application information list, the application is requested to send related information, and the obtained related information is stored in the application information list.

At 104, the identity verification request is encrypted.

The identity information (e.g., an account and a password) in the identity verification request is encrypted. Different encryption algorithms may be used for the identity verification request from different applications. The encryption algorithm may be loaded to the identity management apparatus in advance by the application or by the identity verification server corresponding to the application.

At 105, the identity management apparatus sends the encrypted identity verification request to the identity verification server as a request message.

At 106, when receiving the request message, the identity verification server decrypts the request message, performs related identity verification and generates a returned message, encrypts the identity information in the returned message and then performs secondary encryption for the whole returned message.

At 107, the identity verification server sends the returned message to the identity management apparatus.

At 108, after receiving the returned message, the identity management apparatus decrypts the returned message to determine whether the identity verification request is successful.

If the identity verification fails, the stored identity information of the user is removed.

If the identity verification is successful, the identity information in the returned message is decrypted to obtain and store the identity information. The identity information returned by the identity verification server includes two discrete fields, the identity management apparatus needs to decrypt the two discrete fields to obtain the identity information that can be used. For example, the fields of the identity information in the return information are s1 and s3. After decrypting the two fields, the identity management apparatus obtains s2 as final identity information. The identity management apparatus updates and stores the obtained identity information locally, so that the identity information will be used when the application inquires related user identity information.

At 109, the identity management apparatus notifies all the applications in the related application list of the verification result. The related application list includes the application identified at 103.

If the identity verification fails, the identity management apparatus notifies all the applications in the related application list of a failure reason.

Thus, the identity verification process ends.

The above identity verification process may be used for not only user identity login verification, but also identity logout verification, identity change verification. When such event e.g., a login success, a login failure, an identity logout verification, an identity change occurs for each application, the related applications receive a broadcast notification from the identity management apparatus in time, such that the user only needs to be verified once, and then may use related software services.

In various embodiments, in the above steps, encryption and decryption operations (at 104 and 108) performed by the identity management apparatus may be performed by the application itself. In this case, the identity management apparatus is only responsible for identifying the application sending the identity verification request, sending the identity verification request as the request message to the identity verification server, receiving the returned message from the identity verification server, and notifying all the applications in the related application list including the identified application of the identity verification result.

FIG. 2 is a schematic diagram illustrating a structure of an apparatus for managing an identity for a mobile terminal according to various embodiments.

As shown in FIG. 2, the apparatus for managing the identity for the mobile terminal is an identity management apparatus which includes: a storing module 201, an identifying module 202, a sending and receiving module 203 and a notifying module 204.

The storing module 201 stores an application information list corresponding to multiple applications in a mobile terminal, user information, more than one related application lists. When identity verification is failed, the storing module 201 deletes identity information related to an identity verification request, when the identity verification is successful, the storing module 201 stores identity information which is related to an identity verification request and is returned by an identity verification server.

When receiving the identity verification request from one of the multiple applications, the identifying module 202 identifies the application sending the identity verification request. Specifically, the identifying module 202 utilizes the identifier information extracted from the identity verification request, searches the application information list stored in the storing module 201 for the information related to the application. The information related to the application includes: an address of the identity verification server corresponding to the application and a related application list including the application. If the information related to the application is not searched out, the identifying module 202 requests the application to send the related information, and stores the obtained related information to the application information list in the storing module 201.

The sending and receiving module 203 sends a request message obtained according to the identity verification request to the identity verification server, and receives a returned message from the identity verification server.

The notifying module 204 notifies all applications in the related application list including the identified application of an identity verification result obtained according to the returned message. When the identity verification fails, the notifying module 204 also notifies all applications in the related application list including the identified application of a failure reason.

The identity management apparatus may alternatively include an encrypting and decrypting module 205. The encrypting and decrypting module 205 may select a suitable encryption and decryption algorithm for encrypting the identity verification request or encrypting only the identity information in the identity verification request, and then provide the encrypted identity verification request as the request message to the sending and receiving module 203. The encrypting and decrypting module 205 may also select a suitable encryption and decryption algorithm for decrypting the returned message received by the sending and receiving module 203 to obtain the identity verification result and provide the obtained identity verification result to the notifying module 204. If the identity verification is successful, the encrypting and decrypting module 205 further decrypts the identity information in the returned message and provides the decrypted identity information to the storing module 201.

Various embodiments are not limited to the above examples. For example, the identity management apparatus may not include the encrypting and decrypting module 205, the encryption and decryption operations may be performed by the application itself. In this case, after the identifying module 202 identifies the application sending the identity verification request, the sending and receiving module 203 directly sends the identity verification request as the request message to the identity verification server, and after receiving the returned message from the identity verification server, the returned message is directly provided to the notifying module 204, the returned message is regarded as the identity verification result and all applications in the related application list including the identified application is notified of the identity verification result.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above embodiments, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In various embodiments, a CPU in the extension board or the extension unit executes at least part of the operations according to the instructions based on the program codes to realize a technical scheme of any of the above examples.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for managing an identity for a mobile terminal, comprising:
   at a mobile terminal having one or more processors and one or more memories,
   identifying an application sending an identity verification request when receiving the identity verification request from one of multiple applications, sending a request message obtained according to the identity verification request to an identity verification server; and
   notifying all applications in a related application list comprising the identified application of an identity verification result obtained according to a returned message when receiving the returned message from the identity verification server;
   wherein identifying an application sending an identity verification request comprises:
   utilizing identifier information of the application extracted from the identity verification request, searching a stored application information list for related information of the application, the related information comprising: an address of the identity verification server corresponding to the application and the related application list comprising the application; if the related information of the application is not searched out, requesting the application to send the related information, storing the obtained related information in the application information list.

2. The method according to claim 1, wherein sending a request message obtained according to the identity verification request to an identity verification server comprises:
   encrypting identity information in the identity verification request, sending the identity verification request with encrypted identity information to the identity verification server as the request message.

3. The method according to claim 1, wherein when the identity verification server encrypts identity information in the returned message and performs secondary encryption for the returned message,
   notifying all applications in a related application list comprising the identified application of an identity verification result obtained according to a returned message comprises:
   decrypting the returned message to obtain the identity verification result indicating whether the identity verification is successful;
   notifying all applications in the related application list comprising the identified application of the identity verification result obtained.

4. The method according to claim 3, further comprising:
   deleting stored identity information related to the identity verification request and notifying all the applications in the related application list comprising the identified application of a failure reason, when the returned message indicates failure of the identity verification.

5. The method according to claim 3, further comprising:
   decrypting the identity information in the returned message for obtaining and storing the identity information, when the returned message indicates success of the identity verification.

6. The method according to claim 1, wherein the identity verification comprises identity login verification, identity logout verification or identity change verification.

7. An apparatus for managing an identity for a mobile terminal, comprising:
   one or more processors;
   one or more memories storing modules executed by one or more processors comprising:
   an identifying module, adapted to identifying an application sending an identity verification request when receiving the identity verification request from one of multiple applications;
   a sending and receiving module, adapted to send a request message obtained according to the identity verification request to an identity verification server, and receive a returned message from the identity verification server; and
   a notifying module, adapted to notify all applications in a related application list comprising the identified application of an identity verification result obtained according to the returned message;
   wherein the apparatus further comprises a storing module, adapted to store an application information list corresponding to the multiple applications, user information and more than one related application lists; wherein
   the identifying module is adapted to utilize identifier information of the application extracted from the identity verification request, search the application information list stored in the storing module for related information of the application, the related information of the application comprising: an address of the identity verification server corresponding to the application and the related application list comprising the application, and if the related information of the application is not searched out, request the application to send the related information, store the obtained related information in the application information list in the storing module.

8. The apparatus according to claim 7, further comprising:
   an encrypting and decrypting module, adapted to encrypt identity information in the identity verification request, send the identity verification request with encrypted identity information to the sending and receiving module as the request message; decrypt the returned message received by the sending and receiving module to obtain the identity verification result, provide the identity verification result to the notifying module; if the identity verification is successful, decrypt the identity information in the returned message, and provide the decrypted identity information to the storing module.

9. The apparatus according to claim 8, wherein the storing module is further adapted to delete the identity information related to the identity verification request when the identity verification fails; and store the identity information provided by the encrypting and decrypting module when the identity verification is successful.

10. The apparatus according to claim 7, wherein the notifying module is further adapted to notify all the applications in the related application list comprising the identified application of a failure reason, when the identity verification fails.

11. The apparatus according to claim 7, wherein the identity verification comprises identity login verification, identity logout verification or identity change verification.

12. A non-transitory machine-readable storage medium storing instructions to cause a mobile terminal to execute a method comprising:
    identifying an application sending an identity verification request when receiving the identity verification request from one of multiple applications, sending a request message obtained according to the identity verification request to an identity verification server; and
    notifying all applications in a related application list comprising the identified application of an identity verification result obtained according to a returned message when receiving the returned message from the identity verification server;
    wherein identifying an application sending an identity verification request comprises:
    utilizing identifier information of the application extracted from the identity verification request, searching a stored application information list for related information of the application, the related information comprising: an address of the identity verification server corresponding to the application and the related application list comprising the application; if the related information of the application is not searched out, requesting the application to send the related information, storing the obtained related information in the application information list.

13. The non-transitory machine-readable storage medium according to claim 12, wherein sending a request message obtained according to the identity verification request to an identity verification server comprises:
    encrypting identity information in the identity verification request, sending the identity verification request with encrypted identity information to the identity verification server as the request message.

14. The non-transitory machine-readable storage medium according to claim 12, wherein when the identity verification server encrypts identity information in the returned message and performs secondary encryption for the returned message,
    notifying all applications in a related application list comprising the identified application of an identity verification result obtained according to a returned message comprises:
    decrypting the returned message to obtain the identity verification result indicating whether the identity verification is successful;
    notifying all applications in the related application list comprising the identified application of the identity verification result obtained.

15. The non-transitory machine-readable storage medium according to claim 12, further comprising:
    deleting stored identity information related to the identity verification request and notifying all the applications in the related application list comprising the identified application of a failure reason, when the returned message indicates failure of the identity verification.

16. The non-transitory machine-readable storage medium according to claim 12, further comprising:
    decrypting the identity information in the returned message for obtaining and storing the identity information, when the returned message indicates success of the identity verification.

17. The non-transitory The machine-readable storage medium according to any one of claim 12, wherein the identity verification comprises identity login verification, identity logout verification or identity change verification.

\* \* \* \* \*